(12) United States Patent
Thomas

(10) Patent No.: US 11,423,177 B2
(45) Date of Patent: Aug. 23, 2022

(54) SYSTEMS AND METHODS FOR ESTABLISHING TRUST ONLINE

(71) Applicant: William David Thomas, Roswell, GA (US)

(72) Inventor: William David Thomas, Roswell, GA (US)

(73) Assignee: Evident ID, Inc., Alpharetta, GA (US)

( * ) Notice: Subject to any disclaimer, the term of this patent is extended or adjusted under 35 U.S.C. 154(b) by 911 days.

(21) Appl. No.: 15/041,876

(22) Filed: Feb. 11, 2016

(65) Prior Publication Data

US 2017/0236230 A1     Aug. 17, 2017

(51) Int. Cl.
*G06F 21/64* (2013.01)
*G06Q 50/26* (2012.01)
*G06F 21/62* (2013.01)

(52) U.S. Cl.
CPC ........ *G06F 21/645* (2013.01); *G06F 21/6245* (2013.01); *G06F 21/64* (2013.01); *G06Q 50/265* (2013.01); *G06Q 2220/10* (2013.01)

(58) Field of Classification Search
CPC . G06Q 50/265; G06Q 50/01; H04W 12/0804; H04W 4/80; H04L 67/104; H04L 67/22; G06F 16/5854
See application file for complete search history.

(56) References Cited

U.S. PATENT DOCUMENTS

| | | |
|---|---|---|
| 7,392,388 B2 | 6/2008 | Keech |
| 8,364,605 B2 | 1/2013 | Rosenthal et al. |
| 8,489,071 B2 | 7/2013 | Mechaley, Jr. |
| 8,549,657 B2 | 10/2013 | Karlson et al. |
| 8,726,009 B1 * | 5/2014 | Cook ............... H04L 9/083 713/168 |
| 8,774,781 B1 | 7/2014 | Speiser et al. |
| 8,776,180 B2 | 7/2014 | Kumar et al. |

(Continued)

FOREIGN PATENT DOCUMENTS

| | | | | |
|---|---|---|---|---|
| WO | WO-2005096117 A1 * | 10/2005 | ............. | G06F 21/32 |
| WO | WO-2013109932 A1 * | 7/2013 | ............. | G06F 21/31 |

(Continued)

OTHER PUBLICATIONS

Jumio's ID verification technology, Netverify https://www.jumio.com/netverify/.

(Continued)

*Primary Examiner* — Jacob C. Coppola
(74) *Attorney, Agent, or Firm* — Clements Bernard Baratta; Lawrence A. Baratta, Jr.

(57) ABSTRACT

Trust systems and methods include receiving a request from a first user, wherein the request is to a second user and relates to the second user sharing verified facts, attributes, and other pertinent information used by the first user in determining a level of trust to be afforded to the second user; providing the request to the second user for consent and for data acquisition related to the request; performing data acquisition responsive to the consent to obtain data; determining a response to the request based on the data; and providing the response to the first user, wherein the response is a minimum subset or derivative of the data required to answer the request so that the data is only shared with the first user on a limited basis.

19 Claims, 5 Drawing Sheets

(56) References Cited

U.S. PATENT DOCUMENTS

| | | | |
|---|---|---|---|
| 8,850,535 B2 | 9/2014 | Liberman et al. | |
| 9,147,042 B1* | 9/2015 | Haller | G06Q 40/08 |
| 9,805,213 B1* | 10/2017 | Kragh | G06F 16/245 |
| 2006/0212931 A1 | 9/2006 | Shull et al. | |
| 2006/0259320 A1 | 11/2006 | LaSalle et al. | |
| 2007/0124226 A1 | 5/2007 | Garner, Jr. | |
| 2008/0127296 A1* | 5/2008 | Carroll | G06F 21/33 726/1 |
| 2008/0168048 A1* | 7/2008 | Bell | G06F 16/951 |
| 2009/0228714 A1 | 9/2009 | Fiske et al. | |
| 2009/0300355 A1* | 12/2009 | Crane | H04L 63/0807 713/168 |
| 2010/0050233 A1* | 2/2010 | Ross | G06F 21/33 726/2 |
| 2010/0306076 A1 | 12/2010 | Taveau et al. | |
| 2011/0106610 A1* | 5/2011 | Landis | G06Q 30/0255 705/14.39 |
| 2011/0113098 A1 | 5/2011 | Walsh et al. | |
| 2011/0145920 A1 | 6/2011 | Mahaffey et al. | |
| 2012/0179909 A1* | 7/2012 | Sagi | H04L 9/0872 713/167 |
| 2012/0200390 A1 | 8/2012 | Saravanan | |
| 2012/0233665 A1 | 9/2012 | Ranganathan et al. | |
| 2013/0091540 A1* | 4/2013 | Chen | H04W 4/21 726/1 |
| 2013/0109349 A1 | 5/2013 | Iyengar | |
| 2013/0152182 A1 | 6/2013 | Pala | |
| 2013/0191898 A1* | 7/2013 | Kraft | G06F 21/31 726/6 |
| 2013/0205380 A1 | 8/2013 | Avni et al. | |
| 2013/0227700 A1 | 8/2013 | Dhillon et al. | |
| 2013/0263218 A1* | 10/2013 | Awaraji | G06Q 10/00 726/3 |
| 2013/0303159 A1 | 11/2013 | Gathala et al. | |
| 2014/0090021 A1 | 3/2014 | Berkovnz et al. | |
| 2015/0095999 A1* | 4/2015 | Toth | H04L 9/3263 726/6 |
| 2015/0128240 A1* | 5/2015 | Richards | H04L 63/0861 726/7 |
| 2016/0125199 A1* | 5/2016 | Lee | G06F 21/316 726/28 |
| 2016/0147976 A1* | 5/2016 | Jain | G16H 20/10 705/2 |

FOREIGN PATENT DOCUMENTS

| | | | | |
|---|---|---|---|---|
| WO | WO-2017011713 A1 | * | 1/2017 | A61J 1/035 |
| WO | WO-2017109271 A1 | * | 6/2017 | G06F 21/6209 |

OTHER PUBLICATIONS

Airbnb, "What is Verified ID?" https://www.airbnb.com/support/article/450.

Zoosk, "Zoosk Addresses Top Online Dating Concern with Launch of Photo Verification for Android Devices," Sep. 30, 2014, https://about.zoosk.com/ko/press-releases/zoosk-addresses-top-online-dating-concern-with-launch-of-photo-verification-for-android-devices/.

Ross Charles Langley, "Think online dating should be less creepy? There's an app for that," Mar. 24, 2015 http://www.builtinla.com/2015/03/19/think-online-dating-should-be-less-creepy-there-s-app.

"Love Lab Launches New App to Solve Biggest Problem with Online Dating: Creating Chemistry," Feb. 11, 2015 http://www.reuters.com/article/2015/02/11/ca-love-lab-idUSnBw115239a+100+BSW20150211.

* cited by examiner

SYSTEMS AND METHODS FOR ESTABLISHING TRUST ONLINE

FIELD OF THE DISCLOSURE

The present disclosure generally relates to computer and networking systems and methods. More particularly, the present disclosure relates to systems and methods for establishing trust online.

BACKGROUND OF THE DISCLOSURE

Twenty years ago the Internet was primarily used to consume information and speed up communication. The Internet has changed dramatically and now enables sensitive and personalized interactions with traditional business such as financial institutions, retailers, healthcare providers, and government in addition to a new breed of sharing economy service providers that offer services like ridesharing, temporary work, accommodations and dating. The sharing economy, which enables peer to peer based sharing or access to goods and services, is a particularly sensitive category where an interaction can touch our physical lives (e.g., ridesharing services drive people around, online classifieds connect people to local goods and services, accommodation services let people rent individual rooms within homes or entire houses, dating sites help people find long and short term relationships, etc.). Today, however, little is known or verified about the parties involved in these interactions. The lack of a simple way to establish trust in a peer-to-peer fashion will limit the potential of this new breed of Internet services.

Conventionally, interactions to date have been simplified with little risk, e.g., need a ride, sell a used phone, connect virtually to someone, etc. However, even these simplified interactions have been problematic—reported assaults on ride-sharing services, scams on e-commerce sites, terrorists and other mischievous individuals using social networks, etc. The sensitivity of these interactions is only increasing—consider ridesharing to pick up a child from school, selling an item where they buyer will enter your home, leveraging on-demand temporary staff, or searching for a brief personal encounter. Each of these applications offers a far richer experience but comes with far greater risk to personal safety and well-being. The scale, speed, complexity, and global nature of the Internet and these applications brings an entirely new level of risk, and, unfortunately, new avenues for bad actors to exploit it.

Establishing trust online poses several challenges that do not affect our traditional, offline methods of determining trust. Online, people do not truly know who they are dealing with; and, therefore, cannot determine if they are deserving of trust. This fundamentally limits our willingness to engage in interactions on the Internet. Without a reliable basis for establishing trust, people either trust or distrust for arbitrary reasons, e.g. new service is popular, generational differences lead to risk avoidance, or a user has many social media followers. Online, users often are required to submit personal information as they register for new services. However, they are increasingly concerned about providing such information due to the frequency of data breaches and hacks. These are some of the types of challenges associated with establishing trust online. Without a reliable basis for establishing trust online, there is a ceiling on the type of interactions we are willing to use the Internet to facilitate.

Conventionally, trust is addressed differently by different providers.

Social networks have policies on inappropriate content and work tirelessly to expel users while avoiding thorny freedom of speech issues;

Sharing economy providers and commerce sites use peer reviews to ensure that bad actors have limited opportunity. Under pressure, some have added more extensive background checks. But they constantly balance adoption with safety and security;

Sharing economy providers who specialize in offering temporary work often do some level of validation of the workers who deliver the services. Lack of transparency and standards or regulation prevent consistency;

Social activity sites leave it to users to protect themselves and rarely (if ever) offer peer reviews;

Financial institutions often rely on knowledge-based questions to establish identity which is limited in its ability to establish true identity;

Users often simply take a leap of faith putting their personal safety at risk utilizing the services offered.

Online trust must evolve. A more reliable and transparent trust model is needed to support the scale, speed, complexity, and global nature of the current and future interactions facilitated by the Internet.

BRIEF SUMMARY OF THE DISCLOSURE

In an exemplary embodiment, a computer-implemented method implemented in a trust system includes receiving a request from a first user, wherein the request is to a second user and relates to the second user sharing verified facts, attributes, and other pertinent information used by the first user in determining the level of trust to be afforded to the second user; providing the request to the second user for consent and for data acquisition related to the request; performing data acquisition responsive to the consent to obtain data; determining a response for the request based on the data; and providing the response to the first user, wherein the response is a minimum subset or derivative of the data required to answer the request so that the data is only shared with the first user on a limited basis.

In another exemplary embodiment, a trust system includes a network interface communicatively coupled to a first user and a second user; a processor communicatively coupled to the network interface; and memory storing instructions that, when executed, cause the processor to receive a request from a first user, wherein the request is to a second user and relates to the second user sharing verified facts and other pertinent information used in determining the level of trust to be afforded to the second user; providing the request to the second user for consent and for data acquisition related to the request; perform data acquisition responsive to the consent to obtain data; determine a response for the request based on the data; and provide the response to the first user, wherein the response is a minimum subset or derivative of the data required to answer the request so that the data is only shared with the first user on a limited basis.

In a further exemplary embodiment, a user device includes a network interface communicatively coupled to a trust system; a processor communicatively coupled to the network interface; and memory storing instructions that, when executed, cause the processor to provide a request to the trust system, wherein the request is to a second user and relates to the second user sharing verified facts and other pertinent information used in determining the level of trust to be afforded to the second user; and subsequent to approval of the request by the second user for consent and for data acquisition related to the request, subsequent to data acquisition responsive to the consent to obtain data by the trust system, and subsequent to a response determination by the trust system based on the data, receive the response, wherein the response is a minimum subset or derivative of the data required to answer the request so that the data is only shared with the first user on a limited basis.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a block diagram of a user device 14, which may be used in the trust framework system or the like.

DETAILED DESCRIPTION OF THE DISCLOSURE

Figure 1:
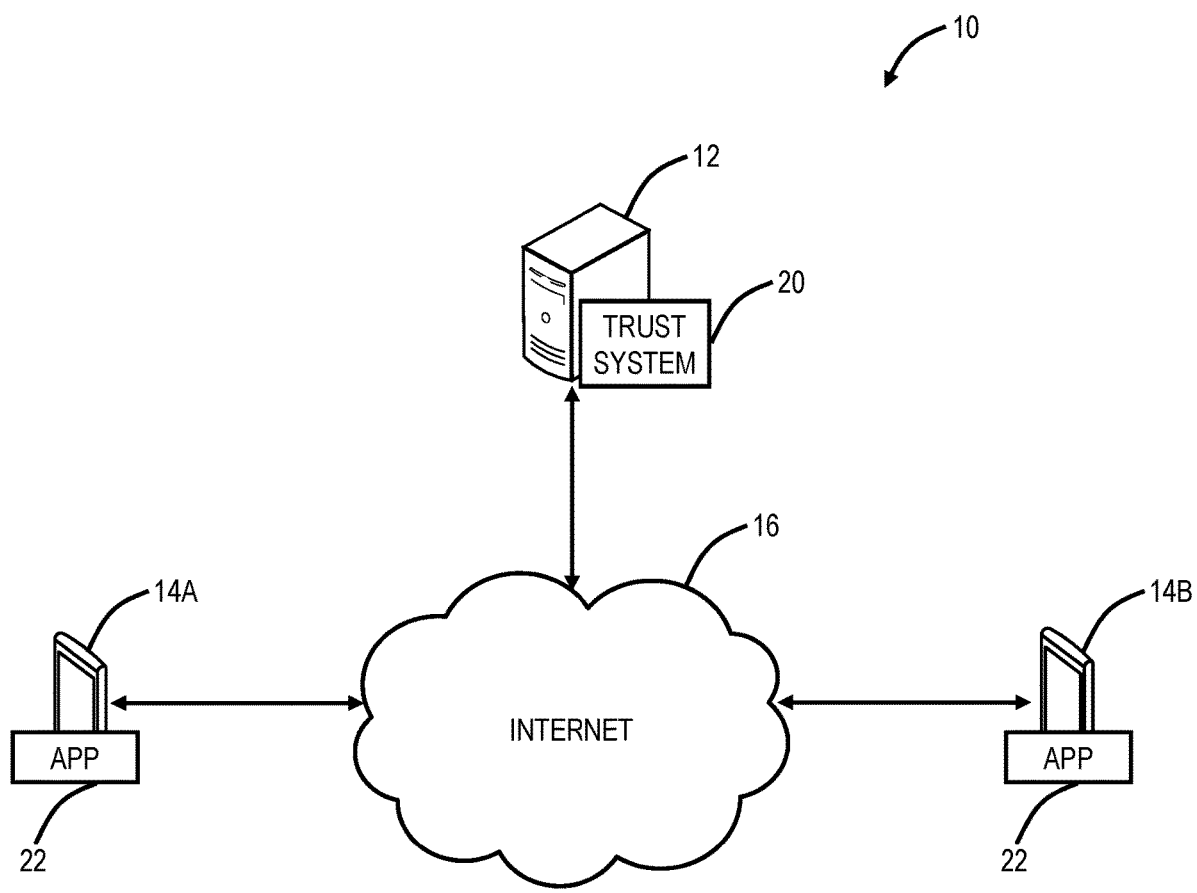
FIG. 1 is a network diagram of a trust framework system.

In various exemplary embodiments, a more reliable and transparent trust model is described to support the scale, speed, complexity, and global nature of interactions facilitated by the Internet. The trust model consists of one or more of the following a) verification of a user's physical identity; b) facts, attributes, and other pertinent information that have been attested to by a relevant party; c) ability to instantly share facts, attributes, other pertinent information, or derivatives; d) ability to limit disclosure of facts, attributes, and other pertinent information to a derivative that reveals the least information required; e) makes the user the exclusive owner of their information with complete control over when and if facts, attributes, and other pertinent information is shared; and f) communicates the level of assurance or security that can be afforded to various elements of the system. All of the above in a convenient and efficient framework.

The trust systems and methods described herein allow for a proofed identity to be paired with facts, attributes, and other pertinent information; allowing a user to create their own authentic ID to be presented as credentials in an interaction; and the like. Variously, the trust systems and methods allow the limited disclosure of facts, attributes, and other pertinent information about a user to a recipient for the purpose of enabling an electronic (online, virtual, etc.) or physical interactions between the individuals or between an individual and a business. Advantageously, the trust systems and methods provide the user complete control over the disclosure of facts, attributes, and other pertinent information. Further, the disclosed information is limited to the least information required in the interaction. In cases where the actual attribute is not to be shared, facts will be derived from the source attribute to enable the minimum amount of information necessary for enabling the interaction. User information may reside in an app, in the cloud, or in another convenient storage location, but in all cases, the user information is encrypted and only accessible by the user themselves. Caching of attested information from Attribute Providers as an attribute store in the cloud provides agility (e.g. eliminates a single point of failure, survivability across end user devices, enables speed of transactions, monitoring, fraud detection, ongoing attribute gathering). The trust systems and methods allow different levels of assurance to be associated with the attributes being requested by the recipient. Further, users can authenticate into the trust systems and methods using existing unique identification (IDs), such as Facebook, Google, phone number, credit/bank card/account, etc., as well as a direct login via a trust system ID. Information recipients can also authenticate and transact using an Application Programming Interface (API) for programmatic interaction with the trust system and methods.

§ 1.0 Trust Framework System

Referring to FIG. 1, in an exemplary embodiment, a network diagram illustrates a trust framework system 10. The trust framework system 10 includes one or more servers 12 communicatively coupled to a plurality of user devices 14 (shown in FIG. 1 as user devices 14A, 14B) through the Internet 16. The one or more servers 12 could also be cloud computing resources or the like. The one or more servers 12 operate a trust system 20 which is configured to provide a trust framework in combination with apps 22 that operate on the user devices 14. FIG. 1 is shown with two user devices 14A, 14B for illustration purposes, and a practical embodiment could include any number of user devices 14. The user devices 14, and the app 22 operating thereon are associated with a user. In general, the trust framework system 10 is configured to allow one of the users, through the user device 14A and the app 22, to ask another user, through the user device 14B and the app 22, a question related to trust. The trust system 20 is configured to work cooperatively with the app 22 to answer the question.

Importantly, the trust system 20 provides a response based on collected facts, attributes or other pertinent information to the questions thereby enabling the receiving user to establish trust with the sending user while minimizing the transmission of personally identifiable information (PII) to the receiving user. Furthermore, the trust system 20 does not necessarily have to provide PII information between the users when answering the questions. Rather, the trust system 20 can provide an indicator for the answer such as red (negative), yellow, or green (affirmative), or yes/no answers to questions based on facts. Additionally, the trust system 20 is open and can be integrated into various online systems. That is, the trust system 20 is independent of authentication, i.e., the trust system 20 is not a Google ID, Apple ID, Facebook login, etc. Rather, the trust system 20 can be used with various different authentication systems.

The trust system 20 is an online service, operated on the one or more servers 12 or the like. It is communicatively coupled to the user devices 14 via the Internet 16, such as through wireless service providers, Local Area Networks (LANs), Wireless LANs (WLANs), and combinations thereof. The trust system 20 is configured to perform the various processes described herein in conjunction with the apps 22. In an exemplary embodiment, the trust system 20 is configured to perform these processes without encryption keys required to access user information (PII or otherwise). Rather, the encryption keys to unlock the user's PII information are always in control of the user on the user's device 14.

The apps 22 are locally operated by the user devices 14. In an exemplary embodiment, the apps 22 are provided to the user devices 14 through application services such as the App Store (Apple), Google Play (Google), or Windows Marketplace (Microsoft). In another exemplary embodiment, the apps 22 are executed locally on the user devices 14 via a Web browser. Other embodiments are also contemplated. The apps 22 enable the users to interact with the trust system 20 for performing various queries as described herein.

§ 1.1 Trust Framework System Functionality

Figure 2:
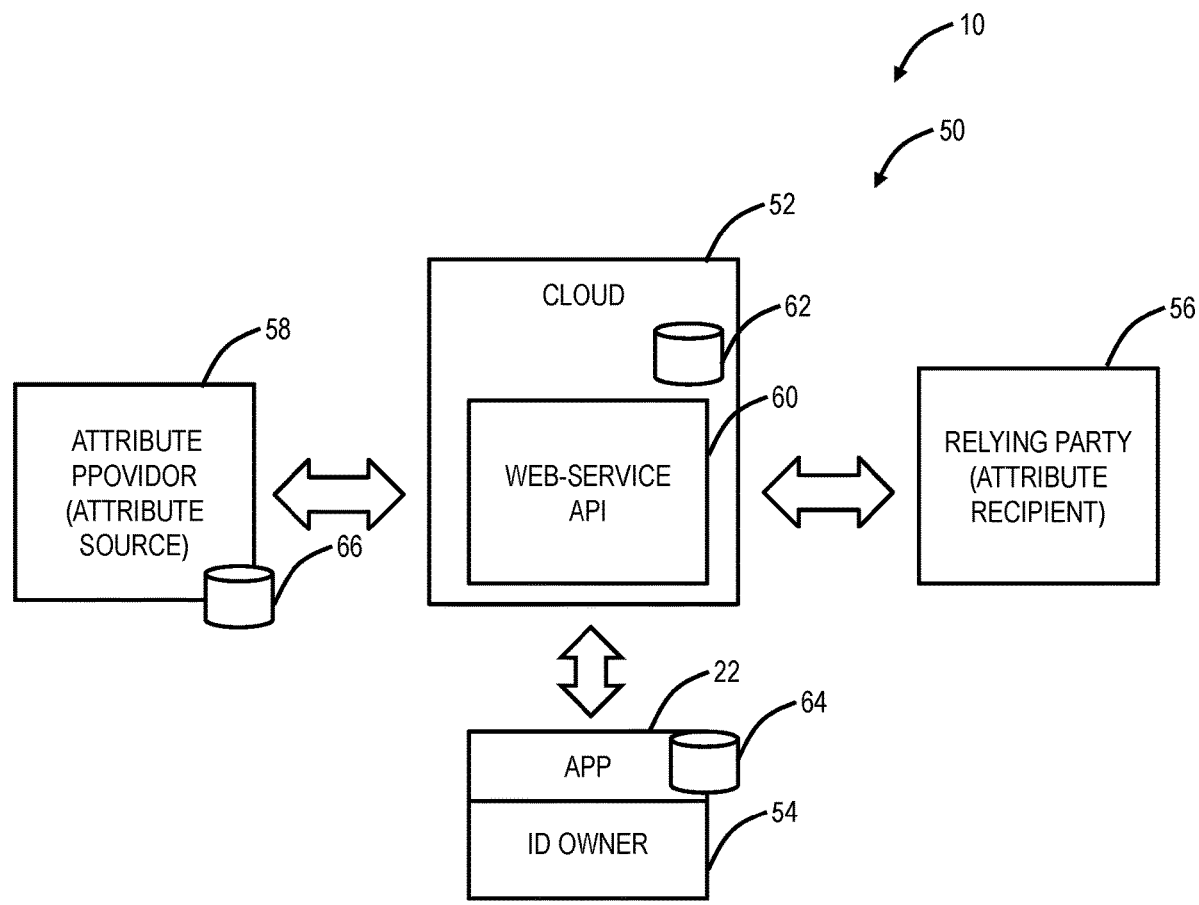
FIG. 2 is a block diagram of functional components of the trust framework system of FIG. 1.

Referring to FIG. 2, in an exemplary embodiment, a block diagram illustrates functional components 50 of the trust framework system 10. The functional components 50 include cloud resources 52, an ID Owner 54 (such as one of the users 14), a Relying Party 56 (such as another one of the users 14), and Attribute Providers 58. These functional components 50 can correspond to the physical devices illustrated in FIG. 1 in the trust framework system 10. For example, the ID Owner 54 and the Relying Party 56 can also be the user devices 14. The cloud resources 52 can be through the trust system 20, and the like. The cloud resources 52 can include a web service API 60 and local data storage 62. The ID Owner 54 can include the user device 14 executing the app 22 along with local data storage 64. The Attribute Providers 58 can be external information sources, verification sources, etc. and can include data storage 66.

Again the functional components 50 of the trust framework system 10 allow the limited disclosure of attested facts, attributes, or other pertinent information about the ID Owner 54 to the Relying Party 56 for the purpose of enabling electronic (online, virtual, etc.) or physical interactions between two individuals or between an individual and a business. The ID Owner 54 can control the information, and disclosure is only with his/her explicit approval. Also, the functional components 50 provide only the minimum amount of information necessary for enabling the interaction. User information may reside in the app 22, in the local data storage 62, or in the data storage 66. Also, caching of information from the Attribute Providers 58 can be done in the cloud resources 52 for agility in information exchanges. The purpose of the functional components 50 is to allow different levels of assurance/verification for the information being requested by the Relying Party 56. The end user 54 can authenticate through the app 22 to the web service API 60 using an existing ID (Facebook, Google, Apple, etc.) or an ID associated with the trust system 20.

§ 1.2 User Information/ID Owner Information

An identification (ID) includes identity (who you are) and attributes (what you are). The identity can have a limitless list of information attached to it. In the trust framework system 10, user information can be logically partitioned into two areas, namely identity information (who you are) and attribute information (what you are). Both types of information can be scored according to levels of assurances and used in the various queries described herein. Identity information unambiguously and uniquely identifies an individual. Assurance of identity translates to the level of confidence that the person is who he/she claims to be. Attribute information can be represented as a structured data model where attributes can be grouped together in a logical hierarchy. Attributes could be behavioral in nature. Assurance of attributes translates to the level of confidence in the authenticity and accuracy of the attribute including factors such as confidence in the Attribute Provider and the timeliness of the attribute.

The user owns the identity information and attribute information and must approve any release of the facts, attributes, or other pertinent information or derivatives of facts, attributes, or other pertinent information based. Requests could be both proactive (pre-approved) and reactive. Pre-approval will require the owner of the information to approve explicitly release of information through application or web page. Once approved the requestor would receive a response with limited to only the specific information the information owner approved. In addition to approving the request, the user may have the option of ignoring the request which the requestor would not receive any response or explicitly denying the request which would result in a confirmation to the requestor that the user had denied the request. The user may also set pre-approvals for the release of information based on specific requestor or for specific types of information, in all cases requests are logged, and the user has visibility to what information was released and to which relying parties the information was released.

§ 1.3 Attribute Provider

In some cases, the trust framework system 10, namely the cloud resources 52 and/or the trust system 20 may need to query external information sources/verification systems in the attribute sources 58. Examples of these systems can include, without limitation, credit bureaus, financial institutions, a government such as the Internal Revenue Service, Department of Motor Vehicles (DMVs), background check companies, financial institutions and the like. These queries can be to gather, verify, or refresh data about a user. The rationale to cache data from the external sources 58 is to allow agility in information exchanges. When the user gives consent to trust framework system 10 to get data on its behalf, data goes directly from the source to the trust framework system 10, which eliminates the possibility of manipulation. In some cases, the trust framework can attest to an attribute and would be able to sign it digitally to track source and authenticity. Additionally, attributes retrieved from attribute providers will be digitally signed to ensure authenticity can be proven at a later point in time. Also, attributes can have an assurance level score assigned to them. The attribute provider will directly or indirectly assist in establishing the level of assurance assigned to each attribute.

§ 1.4 Relying Party

The verified information recipient 56 is the party that is interested in obtaining verified identity and/or attribute information about an individual before engaging in business/personal activities with him or her. Examples can include, without limitation, a bank verifies employment and credit information before giving a loan; an adult e-commerce site verifies age before authorizing a product sale; an online dating user verifies other party's criminal background, age, and employment prior to meeting him or her face to face; a staffing company verifies an individual's identity, criminal history, and qualifications before hiring him or her; and the like.

The trust framework system 10 can also run a behavior analysis algorithm to detect fraud. Machine learning and anomalous behavior detection may be used against user activity, relying party request activity or attribute provider information to detect and isolate potentially fraudulent actions. Fraud detection engines also leverage initial and ongoing proofing techniques. Fraud detection may generate an alert or halt sharing activities for that user. These fraud detection techniques provide the trust system assurances that the user is who they say they are, and the device or keys have not been lost or stolen.

§ 1.5 Cloud

The cloud resources 62 store encrypted information about users and makes it available via APIs 60 for recipients when the ID Owner authorizes the disclosure. Importantly, attribute data at rest which requires explicit ID Owner approval for dissemination (in the components 62 & 64) is encrypted with ID Owner user-controlled keys. Data in transit (between 60 and 56 or 22) is encrypted with session keys only accessible to the Relying Party and the ID Owner. Note, the data at rest can be in the data storages 62, 64. In some cases, limited storage techniques are employed such as, for example, storing a one-way hash that only allows the verification of information but not the retrieval of it. Advantageously, the data is opaque to the trust framework system 10.

§ 1.6 App

The app 22 allows all interaction by users with the trust framework system 10. The app 22 allows the user to control what information can be shared when, and with whom. For example, the app 22 can display a relying party's identity and identity assurance level or specific attribute requested to allow the user to make a decision to allow the dissemination of information. The app 22 can allow the alerting of possible malicious activity, to which the user may respond by halting portions or all information sharing activity. The app 22 can allow some level of identity and attribute proofing using the capabilities of the user device 14 such as, for example, camera, MEMS sensors, GPS, WIFI/3G/LTE radios, etc. For example, for ID validation, the camera can be used to get multiple images of an ID at different angles/light conditions to validate a specific hologram or watermark. The app 22 can also store user information, attributes, or attribute store encryption keys, allow for receiving of information (peer-to-peer information exchange), etc. Attribute store encryption keys may be stored using standards-based mechanisms within the app or rely on 3rd party external storage. The app 22 can also be used for redundancy of storing the attribute encryption keys to provide backup in case of a failure of the end user physical device.

In an exemplary embodiment, the app 22 and the system 10 can utilize a so-called "video selfie" which includes real-time video of the user through the user device 14 where the user repeats a given catchphrase. The catchphrase can be a randomly selected sentence. It is difficult to synthesize a video and audio to repeat the randomly selected sentence. Thus, the video selfie can be used for live video detection of the user in various aspects associated with data acquisition in the system 10.

§ 1.7 Data Model/Attribute Characteristics

Attributes are structured and grouped hierarchically. Attributes can be normalized into a format for the trust framework system 10 when they come from external information sources to allow easier use of the API 60. Attributes can be classified by the user as: publicly searchable, not searchable but available to all, available upon manual authorization, and available upon direct request (automatic authorization). When the user chooses automatic authorization, an algorithm can decide when it's appropriate to disclose the information. Algorithm templates, behavior analysis, and machine learning can be used to make this determination. Attributes can be owned by an individual or by a group of individuals. When a group of individuals owns an attribute, the group defines how many authorizations are needed for disclosure, ranging from 1 to all individuals owning that attribute. Attributes have an assurance level/score associated with them. Attributes and the associated assurance level may have a shelf life and over time become less relevant or meaningful. The attributes may have an acquisition date associated to convey the how recent the attribute is to the relying party. Attribute hierarchy allows for the composite assurance level of a group or subtree of attributes. For the avoidance of doubt identity information is considered a specific type of the attribute in the trust system, attribute characteristics do apply to identity information. Additionally, user activity records and logs are considered specific types of attributes in the trust system, attribute characteristics do apply to user activity records and logs.

The trust framework system 10 has the ability to collect an attribute from a third party and attest to the authenticity of the attribute's source and that the attribute has not been modified or tampered with by using a digital signature. Also, a user can request their own attribute information. Classification of attributes can include searchable, not searchable but public, not searchable but shareable upon request, fully private. The system 10 can include normalization of attribute information such that it can be more easily consumed by a third party regardless of its source. The API 60 can provide access to the identity information and/or the attribute information. The data model can represent multiple attributes for a user with varying levels of assurance. The system 10 can include various processes to combine multiple attributes into an aggregated attribute.

§ 1.8 Proofing

The trust framework system 10 can use the user device 14 as a link between the physical and digital world to verify identity. This can include but is not limited to taking physical world credentials and making them electronic, using a video as proof (especially real-time), using of camera in phone to take a real-time picture to check identity, using location history to verify information, taking a picture of a fingerprint, using location information to prove you are physically in an area, using photos taken by third parties for verification, using other physical or online behavior and activity-based data.

The trust framework system 10 can use the user online presence and activity to assist in verification of identity. This can include aggregation of existing online accounts that require physical/detailed proofing to proof a digital identity (e.g. purchase history from online retailers, bank or loan accounts, credit card, or utility bills). Proofing may also be aided by digital behavior or activity (e.g. call or SMS history, social media activity, web consumption, or mobile application use).

Physical peer proofing can be accomplished using the user devices 14 to detect nearness of two devices to one another using various protocols and systems such as Near Field Communications (NFC), Bluetooth Low Energy (BLE), and sensory components of the device. An exemplary application can be verification of physical presence between users devices to aid in identity proofing.

The analysis of social media history can increase proofing confidence. Note, this is based on the fact that a user, through their user device 14, will be unable to create a historical, social media presence. Years of Facebook posts, Instagram pictures, LinkedIn updates, etc. are likely not fake as social media posts cannot be post dated resulting in significant time and effort requirements to falsify such information.

Correspondingly, the user device 14 can also be used to support initial and continuous proofing by capturing and analyzing a user's physical and digital behavior and activities. This can include phone usage history; how fast a user responds to texts, emails, etc.; what apps are installed on the user device 14; determination of the phone's ID (phone number, MAC address, IP address, etc.); or any types of activity on the user device 14. That is, activity on the user device 14 can provide valuable and difficult to falsify information about the user. By difficult, this is because of the patterns and data collected over time offer a globally unique data set that would require a substantial effort that would go into falsifying identity through replicating real world behaviors. For example, if the location history shows the user is at a location during work hours most of the time, it is likely this is the work location of the user. Various other behaviors can be derived from usage over time.

§ 1.9 Speed

The trust framework system 10 can enable instant dissemination of attributes in a peer-to-peer fashion with the trust system 20 acting as a aggregated cache 62 of previously obtained, attested to facts, attributes, or other pertinent information from multiple 3rd parties. Additionally, an API 60 provides a single and consistent integration to get attributes from multiple originating sources. A relying party no longer needs to perform multiple disparate integrations to data sources or wait for source dependent data acquisition response times (varies from seconds to hours or days).

§ 1.10 Limited Disclosure

The trust framework system 10 supports limited disclosure to provide the ID Owner a greater degree of control over the dissemination of facts, attributes, or other pertinent information while at the same time satisfying the minimum requirements of the Relying Party. Algorithms implemented to interpret inbound requests from 56 to 60 allow derivative attributes to be created from the source attribute to provide attribute information that remains attested to and can establish trust but protects facts, attributes, or other pertinent information. Limited Disclosure also eliminates the need for the Relying Party to have awareness or store facts, attributes, or other pertinent information. Exemplary applications can include confirmation of over 21 years of age as a yes/no answer rather than providing birth date; certification of not having a criminal background as a yes/no answer without releasing specific details about that background.

The trust framework system 10 supports a proximity-based ID with limited disclosure. Exemplary applications can include if you are involved in a traffic stop your ID could be shared with the police officer remotely without the officer getting out of the vehicle; if you are entering a building, you could use the user device 14 with the app 22 to prove relevant credentials to unlock a door; etc. Generally, the system 10 can be proximity based, limited disclosure of identity and attribute information. Either the communication capabilities of the user device 14 or the car could be used to disclose identity or attributes.

§ 1.11 Assurance Levels

The trust framework system 10 enables dynamic risk assessment based on a communicated assurance level. The system 10 attaches an assurance level to all identities, proofings, attributes and other pertinent information for risk assessment purposes. That is, all data input into the system 10 can have some assurance level. Assurance levels are dynamic and will change both over time and based on the requestors context. Time-based variability of assurance level can be based on aging/staleness of data. Variability of assurance level based on context will be dependent on a number of factors (e.g. the relying party requesting the information, quantity of aggregated sources to corroborating the information, Attribute Provider source, etc.). The assurance level may have fixed and dynamic variability based on source (e.g., Hacking/Data Loss Activity that may have happened to the source). A relying party may provide predetermined factors to determine assurance level based on how the information is planned to be used in application/context/recipient. Context variability may result in two different requests for identical information from the trust system determining two different assurance levels to convey.

In some cases, the assurance level may be predetermined by the requestor but due to limited disclosure and protection of fact, attribute or pertinent information owner privacy, the requester may not have visibility to what or how the assurance level was applied to an attribute.

§ 1.12 Tracking/Audit

Also, the trust framework system 10 can detect anomalous activity, ID theft, user device 14 theft, etc. since it can maintain a normalized but anonymized view of the user's account activity. Specifically, the system 10 can maintain data related to the user over time. As described herein, the maintained data can be anonymized or opaque to the system 10, but normalized. As such, suspicious or fraudulent activity can be detected based on a new data which varies from the normalized data. In an exemplary embodiment, an alert can be provided to the user by the system 10. This fraud detection can be between the user and the system 10.

Additionally, the system 10 can also be used for affirmative consent tracking and audits. Here, two users can use the system 10 for business dealings, tracking, consent, audits, etc. Various applications are possible such as using the user devices 14, through the system 10, to provide consent to some dealing or agreement, etc.

§ 1.13 Privacy Policy of Disseminated Information

The trust framework system 10 can further allow the Relying Party 56 to express privacy policies to be applied to any of the facts, attributes, or other pertinent information the ID Owner 54 decides to disseminate. ID Owner 54 can provide consent to the dissemination based on the privacy policies. The privacy policies can be anything related to the use of the facts, attributes, or other pertinent information which constrains the use of such information by the Relying Party 56. For example, assume the Relying Party 56 requests a piece of information from the ID Owner 54 (e.g., the ID Owner 54's social security number). The privacy policy may be that the Relying Party 56 will only use this piece of information for one transaction. Specifically, the ID Owner 54 may consent to the information dissemination based on the privacy policy.

§ 2.0 Trust Framework Process

Figure 3:
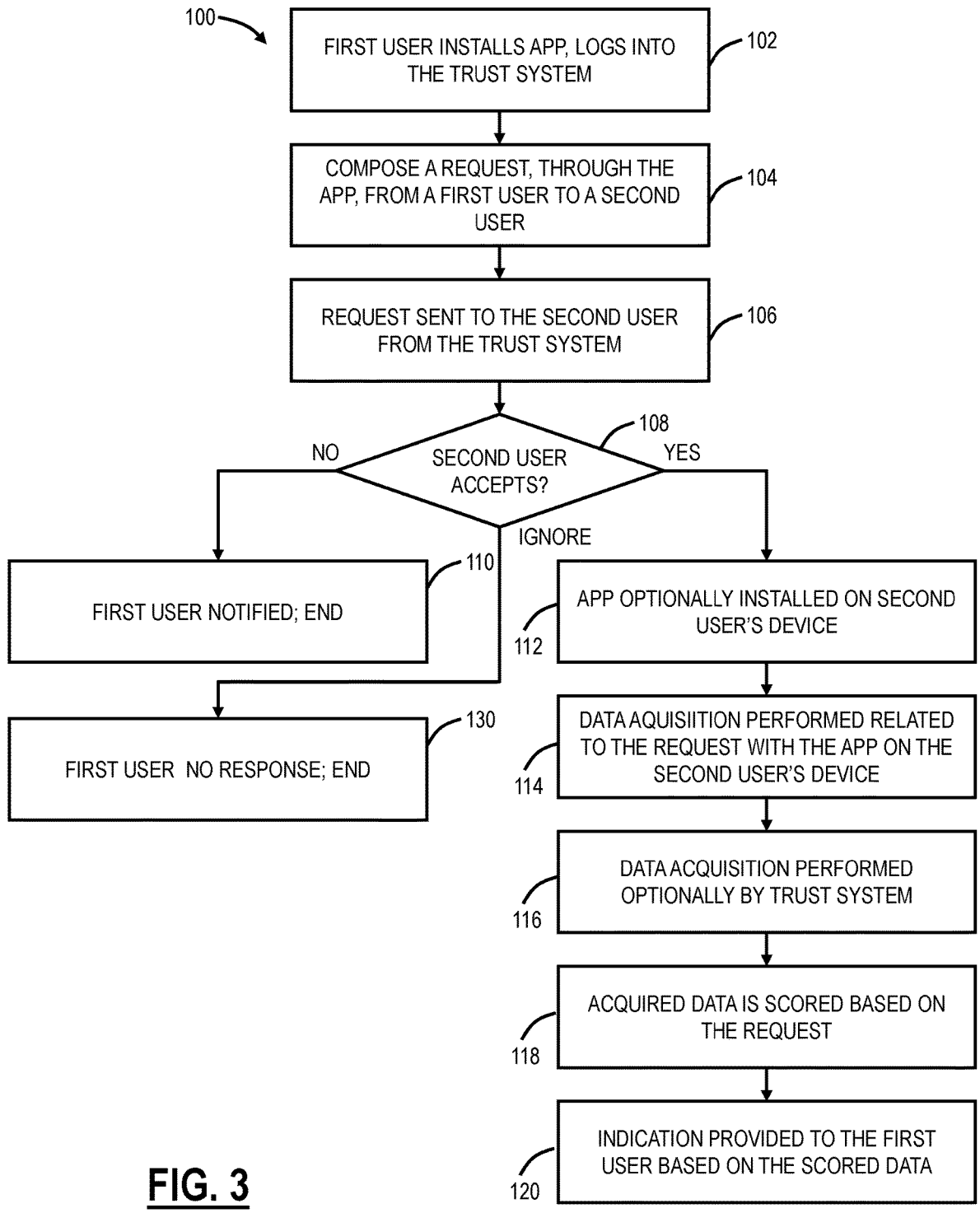
FIG. 3 is a flowchart of a process for determining trust between two users, through the trust framework system.

Referring to FIG. 3, in an exemplary embodiment, a flowchart illustrates a process 100 for determining trust between two users, through the trust framework system 10. The process 100 is performed in the trust framework system 10 with the trust system 20 and the apps 22. For illustration purposes, the process 100 is described with regard to two users, a first user, and a second user, with the first user making a request to the second user. The trust system 20 and the apps 22 are configured to perform functionality in three areas, namely i) Query Processing, ii) Data Acquisition, and iii) Data Scoring. Query processing includes user management, exchanging questions between users, etc. Data acquisition includes acquiring data from one of the users based on a request from another user. The data acquisition can be performed by the app 22, by the trust server 20, or through inquiries from third parties. Finally, the data scoring includes analyzing the acquired data to determine a response to the request.

The process 100 includes a first user installing the app 22 and logging into the trust system 20 (step 102). Again, the app 22 can be an app installed on a mobile device, e.g., iPhone, Android, Windows phone, Blackberry, etc. Alternatively, the app 22 can be locally executed through a Web Browser. Other embodiments are also contemplated. The first user logs into the trust system 20, such as creating an account on the trust system 20, using login credentials from other systems (e.g., Google ID, Apple ID, Facebook login, etc.). Optionally, the first user can provide data to the trust system 20 to provide an initial indicator of trust for the first user as part of the account creation process. Here, the request in the process 100 could be: "Is the first user providing their real name?"

The foundation of the trust framework system 10 is one user asking something of another user, to determine trustworthiness. The process 100 include the first user composing a request, through the app 22, to the second user (step 104). The request can be a query that enables the first user to discern the trustworthiness of the second user. The second user can be identified by any uniquely identifiable information such as email address, phone number for SMS text, username, etc. Offline, people determine the trustworthiness of one another through a variety of ways that generally include acquiring data from credible sources and evaluating facts to make a determination. In this manner, the trust framework system 10 seeks to provide similar functionality in an online manner.

The request can relate to any information or data the first user would use to evaluate the trustworthiness of the second user. Examples can include, without limitation:

Age validation for websites—is the second user 18 for adult websites or tobacco transactions, 21 for alcohol transactions, etc.

Validation of individuals involved in "sharing economy" interaction—ride sharing, etc. —Does my driver have a safe driving record?

Safety & health validation for online dating

Safety & financial validation of a potential roommate

Safety & security for children that are online

Safety & security for visitors entering physical premises or facilities

Criminal Background history for a temporary working looking to hire

The request is sent to the second user from the trust system 20 (step 106). The request is sent based on the uniquely identifiable information. For example, if the second user is identified by email address, the request can be emailed, if the second user is identified by phone number, the request can be sent via text message, if the second user is already registered notification may happen within the app 22, etc. The second user can determine whether or not to participate (step 108). If the second user declines the request affirmatively or ignores the request (step 108), the first user is notified or does not receive any response, and the process 100 ends. Note, the second user's unwillingness to participate may indicate untrustworthiness to the first user (step 110), ability to ignore the first users requests provides privacy for the second user.

If the second user accepts the request (step 108), the second user can be prompted to install the app 22 on the second user's device (step 112). Alternatively, the software code can be sent to the second user's device that is executed by a Web browser so that the second user does not need to install the app 22.

The process 100 includes performing data acquisition related to the request with the app 22 on the second user's device (step 114). Also, the process 100 can include data acquisition through the trust system 20 as well (step 116). Again, in a similar manner as offline trust determinations, the process 100 seeks to acquire facts, attributes, or other pertinent information to enable the first user to determine whether or not the second user is qualified or authorized. Importantly, the data is attested to information as well as PII, facts, attributes, and other pertinent information, but it is not directly communicated to the first user, and it is stored so only the second user can access it. Rather, the data is acquired to create derivative attributes to respond to the request e,g, yes no answers to questions about facts rather than convey the facts directly. In this manner, the data is shared with the first user on a limited basis, i.e., the first user does not need all of the PII, facts, attributes, and other pertinent information, but rather only enough information to respond to the request.

The acquired data is scored based on the request (step 118), and an indication is provided to the first user based on the scored data (step 120). The data acquisition is meant to be minimally invasive for the convenience and privacy of the second user. Also, the data acquisition is targeted, based on the specific request. The acquired data is scored to determine the assurance level of the conveyed facts. The assurance level may protect the source and privacy of the second user through abstraction of several factors. Assurance level would be conveyed as an indication of confidence, e.g., green, red, yellow; the scale of 1 to 10; etc.

§ 3.0 Data Acquisition Techniques

Figure 4:
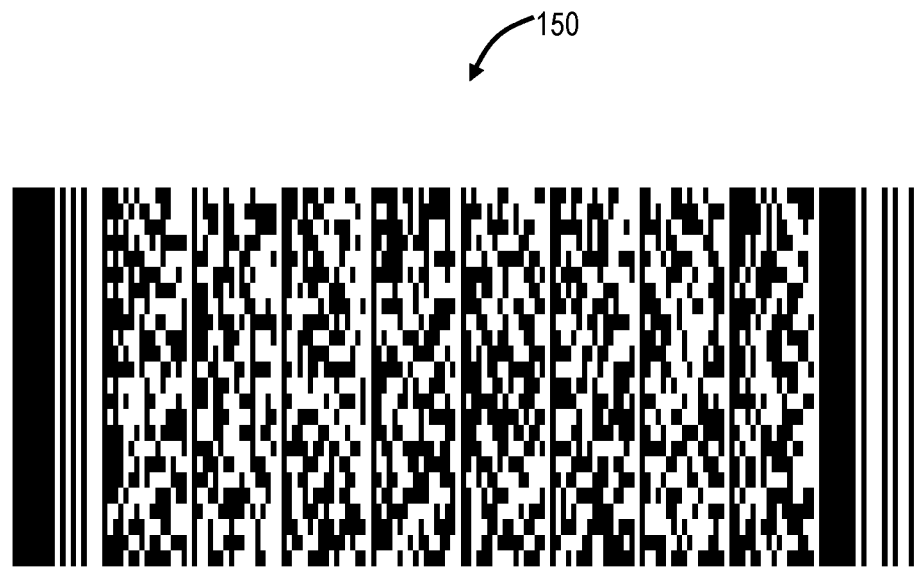
FIG. 4 is an example 2-dimensional code, e.g., a QR code, PDF 417.

Quick Response (QR) code or another type of 2-dimensional/1-dimensional barcode—take a picture/scan of a QR code or other type of code via the user's device 14 and the app 22 of a verified document or identification card, such as a driver's license, passport, etc. Here, the app 22 and the user device 14 can be configured to decode the code and verify the information. This could be useful in the verifying of the date of birth, name, address, etc. FIG. 4 is an example 2-dimensional code 150, e.g., a PDF 417. The 2-dimensional code 150 is available on many verified documents and can be captured by the user device 14, analyzed, decoded, or decrypted to obtain verified data.

Interrogate the user device 14—in an exemplary embodiment, the app 22 can be configured to interrogate the user device 14 to learn about the second user, in the context of answering the request. This can look at the other types of apps installed on the user's device 14, the accounts such as social media, financial, etc. on the user's device 14, the user's behavior on the device 14. Also, interrogating the user device 14 can help answer the question—is the user who they say they are? That is, through analysis of email, text, phone numbers, and social media, on the user device 14, vast amounts of data can be acquired responsive to the request.

Interrogate the second user's social media accounts—this can be through interrogating the user device 14 above or separately by determining the second user's identification/username from interrogating the user device 14 and performing an analysis separately using the trust system 20.

Credit reports and other third-party information systems can be used. For example, the code scanned from above can provide a legal name for the user, which in turn can be used to query third-party information systems. The third-party information systems can be any public records database systems, including, without limitation, court records, birth records, marriage records, criminal records, professional and business license records (attorneys, doctors, engineers, etc.), voter registration records, sex offender registries, civil judgments and liens, bankruptcy records, etc. Also, credit cards, bank, utility bills, etc. can be used to verify identity and gain additional assurances on individuals identity.

§ 4.0 Request Examples and Associated Data Acquisition

§ 4.1 Age Validation

Here, the request is whether the second user is truthful relative to their age (or date of birth). This can be used for adult website access (>18), alcohol transactions (>21), any e-commerce application (user needs to be 18 or older to legally contract), age verification for social networks (e.g., >13 for a Facebook profile, etc.).

The request can be "Is the second user XX or older?" and the data acquisition can determine information to determine whether or not the answer to the request is yes or no.

The data acquisition can include obtaining information about the user that can provide a verified age. This can include, for example, scanning a PDF417 code or perform optical character recognition (OCR) on a license or other government issued ID, running a public records search, etc.

§ 4.2 Validation of Individuals Involved in "Sharing Economy" Interaction

Here, the request is whether there are warning flags related to the second user relative to the first user performing a "sharing economy" interaction. A "sharing economy" interaction can include, for example, ridesharing, meetup/dating apps, freelance services, accommodations, and the like. The warning flags are meant to help the first user have more information before deciding to enter into the interaction. In this manner, the request is meant to assist the first user in determining whether or not trust is warranted.

The response or result can be a green (appears safe), yellow (unsure), or red (warning) as well as a numerical value (1-10, 10 being safest). The warning flags can be determined by looking at various data points, such as, without limitation:

Is the second user's name, address, age, etc. valid? That is, is the information provided by the second user to the first user correct?

Does the second user have any records that would dissuade the first user from entering into a "sharing economy" interaction? For example, arrests, sex offender registration, etc.

Does the second user's behavior lead to anything that would dissuade the first user from entering into a "sharing economy" interaction? For example, upon interrogating the second user's device 14, are they warning flags detected? Significant profanity may dissuade someone from allowing their children to ride with the second user, etc.

The data acquisition can include obtaining information about the user that can provide information to determine if warning flags exist. This can include, for example, scanning a PDF417 code on a license, or other government-issued ID, running a public records search, interrogating the user device 14, etc.

§ 4.3 Safety & Health Validation for Online Dating

Similar to the "sharing economy" interaction above, online dating is a specific type of "sharing economy" interaction. In addition to the description above, online dating can also need more relevant health information. Here, the request is whether there are warning flags related to the second user relative to the first user dating or entering into a romantic relationship. The response or result can be a green (appears safe), yellow (unsure), or red (warning) as well as a numerical value (1-10, 10 being safest).

In addition to everything above in the "sharing economy" interaction, the data acquisition can include obtaining medical information, records, etc. For example, one aspect could be a Sexual Transmitted Disease (STD) test, and the system 10 can maintain privacy and not provide the responses or results to the first user, but provide an indication of whether or not there are potential issues from a trust perspective.

§ 4.4 Other Scenarios

As described herein, other scenarios may include Safety & financial validation of a potential roommate, Safety & security for children that are online, Safety & security for visitors entering physical premises or facilities, proof the user is who they say they are for a financial transaction or approval, etc.

These are all similar to above, with each different scenario being handled by the trust framework system 10. The differences for each different scenario are 1) what the request is, 2) what data is needed to answer the request, and 3) what algorithm is used to analyze the data.

With respect to the data analysis algorithm, some requests are discrete—is the user old enough? Does the user have a criminal record? Is the user telling the truth about a verifiable fact? Etc.

Other requests require a heuristics approach to providing an answer. For example, can I trust the driver of my ride-sharing service to take me to my destination? Can I trust this person to go on a date? Etc.

The heuristics approach can take data and perform an analysis to come ultimately up with a green, yellow, red or some other objective criteria to answer the request.

§ 3.0 Exemplary Server Architecture

Figure 5:
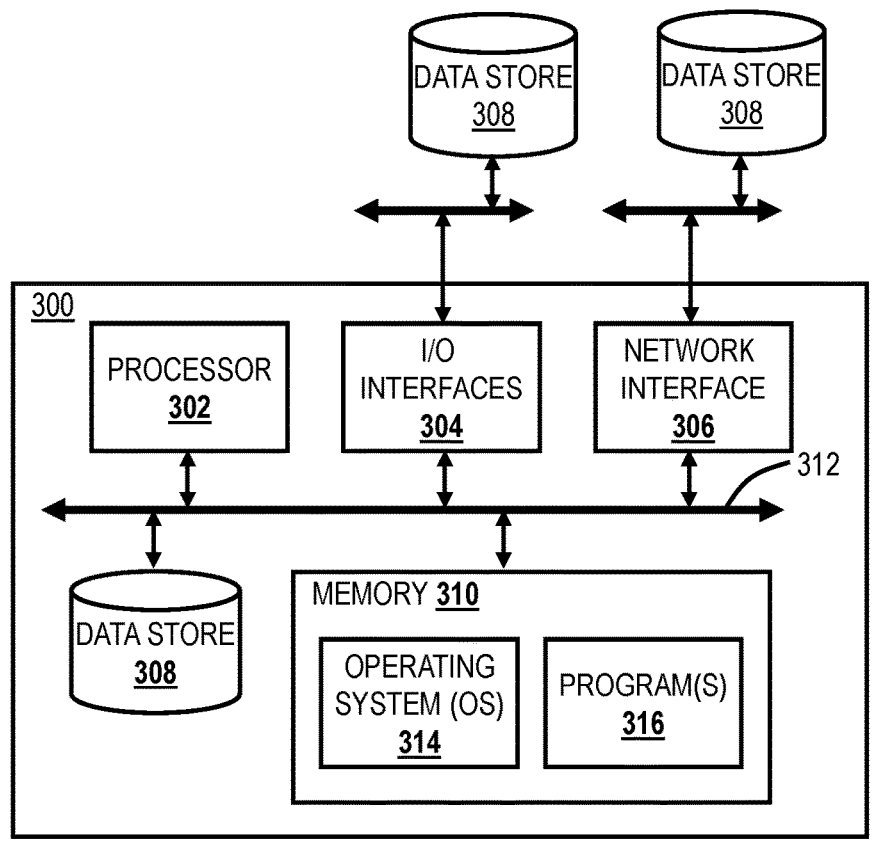
FIG. 5 is a block diagram of a server which may be used in the trust framework system, in other systems, or standalone.

Referring to FIG. 5, in an exemplary embodiment, a block diagram illustrates a server 12 which may be used in the system 10, in other systems, or stand-alone. The server 12 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the server 12 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 12, a semiconductor based microprocessor (in the form of a microchip or chip set), or generally any device for executing software instructions. When the server 12 is in operation, the processor 302 is configured to execute software stored within the memory 310, to communicate data to and from the memory 310, and to generally control operations of the server 12 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 12 to communicate on a network, such as the Internet, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 12 such as, for example, an internal hard drive connected to the local interface 312 in the server 12. Additionally in another embodiment, the data store 308 may be located external to the server 12 such as, for example, an external hard drive connected to the I/O interfaces 304 (e.g., SCSI or USB connection). In a further embodiment, the data store 308 may be connected to the server 12 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 6:
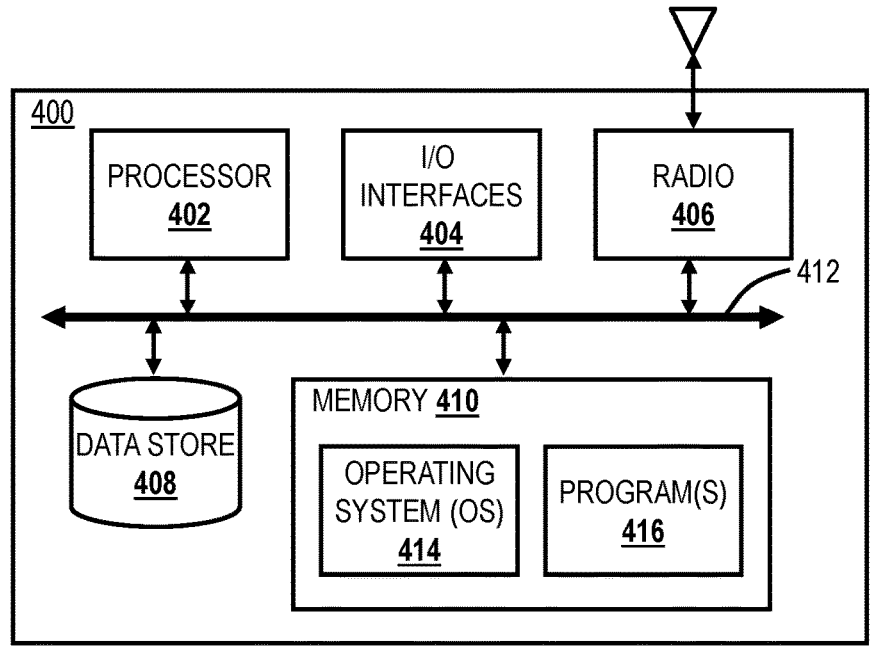

Referring to FIG. 6, in an exemplary embodiment, a block diagram illustrates a user device 14, which may be used in the system 10 or the like. The user device 14 can be a digital device that, in terms of hardware architecture, generally includes a processor 402, input/output (I/O) interfaces 404, a radio 406, a data store 408, and memory 410. It should be appreciated by those of ordinary skill in the art that FIG. 6 depicts the user device 14 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 14, a semiconductor-based microprocessor (in the form of a microchip or chip set), or generally any device for executing software instructions. When the user device 14 is in operation, the processor 402 is configured to execute software stored within the memory 410, to communicate data to and from the memory 410, and to generally control operations of the user device 14 pursuant to the software instructions. In an exemplary embodiment, the processor 402 may include a mobile-optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. Input can also include Near Field Communications (NFC) or the like, such as where two devices touch or are in close proximity to one another. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the user device 14. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the Radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the user device 14. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 10.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method implemented on a server in a trust system communicatively coupled to a plurality of user devices via the Internet, comprising:
   receiving a first request from a first user with a corresponding user device, wherein the first request is to obtain an answer to a question related to a second user and a level of online trust to be afforded to the second user by the first user;
   providing a second request to the second user with a corresponding user device for consent to determine the answer and the level of online trust, and for consent to data acquisition related to determining the answer and the level of online trust;
   performing data acquisition responsive to the consent for data acquisition, the data acquisition including obtaining the data from one or more external sources and from initiating a search on the corresponding user device of the second user, wherein the data includes at least one attribute related to the second user;
   attesting to an authenticity of the one or more external sources of the at least one attribute and attesting that the at least one attribute has not been modified or tampered with based on digital signatures used by the one or more external sources;
   determining a response to the first request based on the data, wherein the response includes a yes/no answer to the question and an assurance level for the question, the assurance level being one of a plurality of assurance levels for the question to establish the level of online trust to be afforded to the second user by the first user, wherein the assurance level represents an authenticity and an accuracy of the at least one attribute determined based on the data, sources of the data including confidence in the one or more external sources, and the digital signatures; and
   providing the response to the first user with the response including (1) the yes/no answer and (2) the assurance level where the assurance level is a minimum subset or derivative of the data that is required to answer the first request, wherein an amount of the data of the second user disclosed to the first user with the yes/no answer to the question and the assurance level for the question is limited based on authorization given by the second user in at least one of the second request, a separate request, and privacy settings, wherein the data of the second user stored by the trust system is encrypted and requires explicit approval by the second user for dissemination, such that the second user maintains control of private information while the second user establishes trust with the first user via the response provided to the first user.

2. The computer-implemented method of claim 1, wherein the data is encrypted and opaque to the trust system and details of the first request are only visible between the first and second users.

3. The computer-implemented method of claim 1, wherein the data is certified and assigned an assurance level by the trust system, and wherein the response is based on the assurance level and the data itself.

4. The computer-implemented method of claim 1, wherein the data acquisition comprises linking physical information gathered electronically comprising one or more of photographing physical credentials, using video of the second user, taking real-time photos of the second user, monitoring a location history of the second user, taking a fingerprint of the second user, and matching photos of the second user with third party photos.

5. The computer-implemented method of claim 1, wherein the data acquisition comprises utilizing electronic information for proofing comprising one or more of aggregating online accounts, monitoring shopping history, and monitoring social media activity.

6. The computer-implemented method of claim 1, wherein the data acquisition comprises utilizing electronic information for proofing by capturing and understanding behavior on a user device of the second user.

7. The computer-implemented method of claim 1, wherein the first user and the second user are in close proximity and utilize one of Near Field Communications, Personal Area Network, Bluetooth Low Energy, or sensors in the mobile device to provide peer proofing of identity or attributes.

8. The computer-implemented method of claim 1, wherein the data comprises identity information and attribute information.

9. The computer-implemented method of claim 1, wherein the data acquisition collects the data, classifies the data, normalizes the data, and provides the assurance level of the data.

10. The computer-implemented method of claim 9, wherein the assurance level of the data is variable and determined on multiple factors; aging/staleness of the data, a source of the data, a confidence of the source, corroboration of the data, and context of the first users planned use of the data.

11. A trust system communicatively coupled to a plurality of user devices via the Internet, comprising:
 a network interface communicatively coupled to a first user and a second user each having a corresponding user device;
 a processor communicatively coupled to the network interface; and
 memory storing instructions that, when executed, cause the processor to
  receive a first request from a first user, wherein the first request is to obtain an answer to a question related to a second user and a level of online trust to be afforded to the second user by the first user;
  provide a second request to the second user for consent to determine the answer and the level of online trust, and for consent to data acquisition related to determining the answer and the level of online trust;
  perform data acquisition responsive to the consent for data acquisition, the data acquisition including obtaining the data from one or more external sources and from initiating a search on a corresponding user device of the second user, wherein the data includes at least one of the verified facts, attributes, and other pertinent information related to the second user;
  attest to an authenticity of the one or more external sources of the at least one attribute and attest that the at least one attribute has not been modified or tampered with based on digital signatures used by the one or more external sources;
  determine a response to the first request based on the data, wherein the response includes a yes/no answer to the question and an assurance level for the question, the assurance level being one of a plurality of assurance levels for the question to establish the level of online trust to be afforded to the second user by the first user, wherein the assurance level represents an authenticity and an accuracy of the at least one attribute determined based on the data, sources of the data including confidence in the one or more external sources, and the digital signatures; and
  provide the response to the first user with the response including (1) the yes/no answer and (2) the assurance level where the assurance level is a minimum subset or derivative of the data that is required to answer the first request, wherein an amount of the data of the second user disclosed to the first user with the yes/no answer to the question and the assurance level for the question is limited based on authorization given by the second user in at least one of the second request, a separate request, and privacy settings, and wherein the data of the second user stored by the trust system is encrypted and requires explicit approval by the second user for dissemination, such that the second user maintains control of private information while the second user establishes trust with the first user via the response provided to the first user.

12. The trust system of claim 11, wherein the first and second requests and data is encrypted and opaque to the trust system and details of the first request are only visible between the first and second users.

13. The trust system of claim 11, wherein the data is certified and assigned an assurance level by the trust system, and wherein the response is based on the assurance level and the data itself.

14. The trust system of claim 11, wherein the data acquisition comprises linking physical information gathered electronically comprising one or more of photographing physical credentials, using video of the second user, taking real-time photos of the second user, monitoring a location history of the second user, taking a fingerprint of the second user, and matching photos of the second user with third party photos.

15. The trust system of claim 11, wherein the data acquisition comprises utilizing electronic information for proofing comprising one or more of aggregating online accounts, monitoring shopping history, and monitoring social media activity.

16. The trust system of claim 11, wherein the data acquisition comprises utilizing electronic information for proofing by capturing and understanding behavior on a user device of the second user.

17. The trust system of claim 11, wherein the first user and the second user are in close proximity and utilize one of Near Field Communications, Personal Area Network, Bluetooth Low Energy, or sensors in the mobile device to provide peer proofing of identity or attributes.

18. The trust system of claim 11, wherein the data comprises identity information and attribute information.

19. The trust system of claim 11, wherein the data acquisition collects the data, classifies the data, normalizes the data, and provides assurance level of the data, and wherein the assurance level of the data is variable and determined on multiple factors; based on aging/staleness of the data, a source of the data, a confidence of the source, and corroboration of the data, and context of the first users planned use of the data.

* * * * *